US009167185B2

(12) United States Patent
Tomiyama et al.

(10) Patent No.: US 9,167,185 B2
(45) Date of Patent: Oct. 20, 2015

(54) TRANSMISSION AND RECEPTION APPARATUS AND TRANSMISSION AND RECEPTION SYSTEM

(71) Applicant: Sony Corporation, Tokyo (JP)

(72) Inventors: Hitoshi Tomiyama, Kanagawa (JP); Nobuhisa Ozawa, Kanagawa (JP); Yuya Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 31 days.

(21) Appl. No.: 13/682,373

(22) Filed: Nov. 20, 2012

(65) Prior Publication Data

US 2013/0141648 A1 Jun. 6, 2013

(30) Foreign Application Priority Data

Dec. 1, 2011 (JP) ................. 2011-263242

(51) Int. Cl.
| | |
|---|---|
| *H03K 7/06* | (2006.01) |
| *H04N 5/44* | (2011.01) |
| *H04L 27/36* | (2006.01) |
| *H04L 27/38* | (2006.01) |

(52) U.S. Cl.
CPC .............. *H04N 5/4401* (2013.01); *H04L 27/36* (2013.01); *H04L 27/3818* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| | | | | |
|---|---|---|---|---|
| 8,412,759 | B2 * | 4/2013 | Petrovic | .......................... 708/300 |
| 2009/0143031 | A1 * | 6/2009 | Shah | .......................... 455/114.1 |

\* cited by examiner

*Primary Examiner* — Adolf Dsouza
(74) *Attorney, Agent, or Firm* — Michael Best & Friedrich LLP

(57) ABSTRACT

A transmission and reception apparatus, system for transmitting and receiving signals, and method for transmitting and receiving signals are disclosed. In one example, a transmitting part produces an output signal including a first digitally modulated signal. A receiving part includes a mixer circuit and receives an input signal including a second digitally modulated signal. A folding signal may be present as a function of the first digitally modulated signal and a clock signal used to produce the first digitally modulated signal. The mixer circuit performs frequency down conversion on the input signal, and may also be configured to perform a harmonic wave removal function on the input signal that reduces the presence of the folding signal from the input signal. The receiving part may further include a filter circuit that receives the frequency-down-converted input signal from the mixer circuit and selects a predetermined reception signal from the frequency-down-converted input signal.

20 Claims, 10 Drawing Sheets

TRANSMISSION AND RECEPTION APPARATUS AND TRANSMISSION AND RECEPTION SYSTEM

BACKGROUND

This disclosure relates to a transmission and reception apparatus and a transmission and reception system.

A transmission and reception system wherein an image is transmitted in the form of an analog signal using a coaxial cable or the like is used widely, for example, as a monitoring camera system.

In a transmission and reception system wherein an analog signal is transmitted using a coaxial cable or the like, as the frequency of a signal to be transmitted increases, and as the transmission distance increases, attenuation of the signal increases. Accordingly, transmission of image data or the like in the form of an analog signal is limited in terms of the length of the transmission distance from a point of view of degradation of the image caused by attenuation of the signal.

Therefore, there is a demand to use a digitally modulated signal by use of quadrature amplitude modulation (QAM) or quadrature phase shift keying (QPSK) or the like in transmission and reception systems adopted in a monitoring camera system and other systems as well, so as to achieve transmission of data such as image data which suffers less degradation. In transmission wherein a digitally modulated signal is used, even if the transmission distance is long, if the strength of the signal exceeds a certain threshold level, then an image which is not degraded significantly can be received by the reception side by carrying out digital signal processing such as error correction.

In order to generate a signal digitally modulated by QAM, QPSK or the like, usually a signal based on a carrier, a data rate and a modulation method is first generated by a digital signal processing circuit. The generated signal is inputted to a D/A converter, and thus a digitally modulated signal is obtained.

In general, a D/A converter carries out sampling based on a predetermined clock signal. The D/A converter therefore outputs a carrier to be generated and a folded signal which is the difference between the clock signal and the carrier. Since the folded signal causes folding distortion, usually an anti-aliasing filter is disposed on the output side of the D/A converter to attenuate the folded signal included in the transmission signal. The technique just described is disclosed, for example, on page 3 of a document searched Nov. 24, 2011 on the Internet (URL: http://www.analog.com/static/imported-files/jp/overviews/ADI_Data_Conversion_Poster_F.pdf).

SUMMARY

For example, in regard to a D/A converter for audio wherein the frequency of a generated carrier is low, it is possible to build an anti-aliasing filter in a semiconductor device such as an IC which configures the D/A converter. However, in regard to a D/A converter that handles a signal of a high frequency like a video signal, if an anti-aliasing filter is incorporated, then it is difficult to obtain a satisfactory characteristic in terms of distortion or noise. Accordingly, for example, in transmission of a video signal, usually such a part as an inductor or a capacitor is used to configure an external anti-aliasing filter. However, external filters are high in cost and besides occupy a great area. These become a factor of obstructing reduction in cost or downsizing of an apparatus for use with a transmission and reception system.

Therefore, it is desirable to provide a transmission and reception apparatus and a transmission and reception system wherein degradation of transmission and reception characteristics does not occur even if the transmission side outputs an output of a D/A converter as it is as a transmission signal and folding distortion based on a folded signal occurs with the transmission signal.

According to one embodiment of the disclosure, there is provided a transmission and reception apparatus, comprising: a transmitting part configured to produce an output signal including a first digitally modulated signal; and a receiving part comprising a mixer circuit, the receiving part being configured to receive an input signal including a second digitally modulated signal, the mixer circuit being configured to perform frequency down conversion on the input signal to produce a frequency-down-converted input signal.

According to another embodiment of the disclosure, there is provided a system for transmitting and receiving signals, the system comprising: a first transmission and reception apparatus comprising: a transmitting part configured to produce a first output signal including a first digitally modulated signal; and a second transmission and reception apparatus comprising: a transmitting part configured to produce a second output signal including a second digitally modulated signal, and a receiving part comprising a mixer circuit, the receiving part being configured to receive as an input signal the first output signal including the first digitally modulated signal, the mixer circuit being configured to perform frequency down conversion on the input signal to produce a frequency-down-converted input signal.

According to still another embodiment of the disclosure, there is provided a method for transmitting and receiving signals, the method comprising: producing an output signal including a first digitally modulated signal; and receiving, by a mixer circuit, an input signal including a second digitally modulated signal, the mixer circuit being configured to perform frequency down conversion on the input signal to produce a frequency-down-converted input signal In the transmission and reception apparatus or the transmission and reception system of the embodiments according to the present disclosure, the reception part or the reception apparatus includes the harmonic wave removing mixer circuit having the frequency down conversion function of a transmission signal inputted thereto from the outside and the filter circuit configured to select a reception signal from within an output of the harmonic wave removing mixer circuit. Accordingly, even if an output of the D/A converter is outputted as it is as a transmission signal of the transmission part or the transmission apparatus, a folded signal included in the transmission signal would not have an influence on the reception part or the reception apparatus.

The features and advantages of the present disclosure will become apparent from the following description and the appended claims, taken in conjunction with the accompanying drawings in which like parts or elements denoted by like reference characters.

DETAILED DESCRIPTION OF THE PREFERRED EMBODIMENTS

Figure 1:
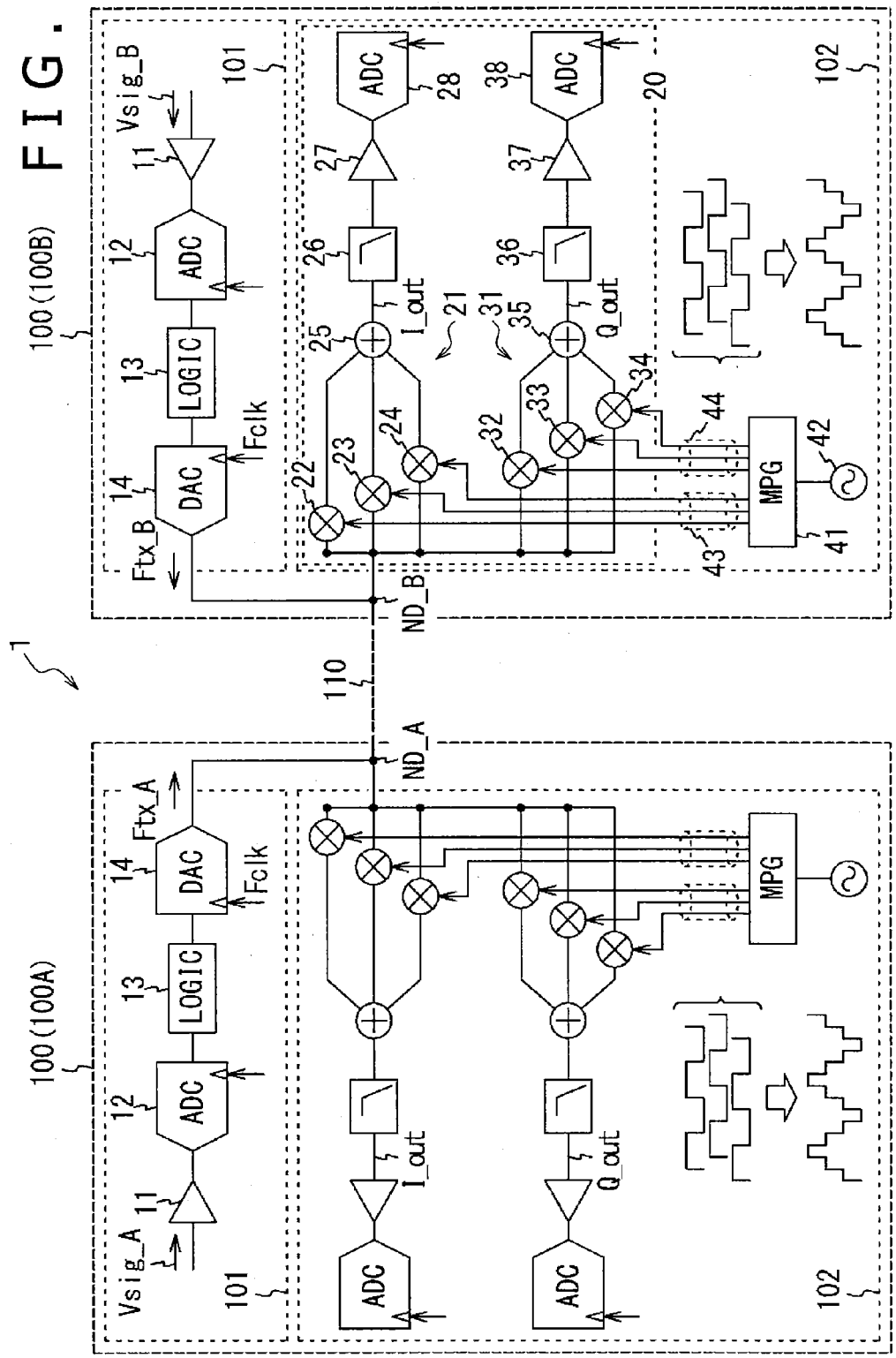
FIG. 1 is a functional block diagram of a transmission and reception system employing a transmission and reception apparatus according to a first embodiment of the present disclosure.

In the following, the present disclosure is described in connection with embodiments thereof with reference to the drawings. The present disclosure is not limited to the embodiments and various numerical values and materials in the embodiments are mere examples. In the following description, like elements or elements having like functions are denoted by like reference characters and overlapping description of them is omitted herein to avoid redundancy. It is to be noted that the description is given in the following order.
1. Transmission and Reception Apparatus and Transmission and Reception System According to Embodiments of the Present Disclosure, General Description
2. First Embodiment
3. Second Embodiment
4. Third Embodiment, Others

Transmission and Reception Apparatus and Transmission and Reception System According to Embodiments of the Present Disclosure, General Description The transmission and reception apparatus according to the above-described embodiment of the present disclosure may be configured such that the output section of the transmission part and the input section of the reception part are connected to the same connection node.

The transmission and reception apparatus according to any one of the embodiments of the present disclosure including the preferred configurations described above may be configured such that the harmonic wave removing mixer circuit includes a plurality of mixers and carries out, by the mixers respectively receiving clock signals having different phases from each other, frequency down conversion of a transmission signal inputted thereto from the outside. In this case, the number of clock signals of different phases may be a power of 2.

The transmission and reception apparatus according to any one of the embodiments of the present disclosure including the various preferred configurations described above may be configured such that a transmission signal is inputted from the outside through a transmission line. In this instance, while such a wire or wireless transmission line as a coaxial cable or a wireless network can be used, from a point of view of suppressing the cost and so forth, the transmission and reception apparatus preferably has the configuration which includes a wire transmission line.

The transmission and reception apparatus according to any of the embodiments of the present disclosure including the preferred configurations described above may be configured such that the connection node is further connected with an output of an analog signal circuit.

The transmission and reception apparatus according to any of the embodiments of the present disclosure including the preferred configurations described above may be configured such that it further includes an analog reception part for receiving an analog signal.

The transmission and reception apparatus according to any of the embodiments of the present disclosure including the various preferred configurations described above may be configured such that the reception part constituting the transmission and reception apparatus at least includes a first receiving section for receiving a first reception signal and a second receiving section for receiving a second reception signal different from the first reception signal.

In the transmission and reception apparatus and the transmission and reception system according to embodiments of the present disclosure (the apparatus and system may be hereinafter referred to simply as "present disclosure"), the method for digital modulation is not limited particularly. Various known methods such as amplitude shift keying (ASK), phase shift keying (PSK), quadrature phase shift keying (QPSK, also called quadrature phase modulation), frequency shift keying (FSK) and quadrature amplitude modulation (QAM) can be applied.

The harmonic wave removing mixer circuit having a frequency down conversion function is, for example, a circuit in which a plurality of mixers having different gains operate based on clock signals having the same frequency but having phases different from each other, and outputs of the mixers are added to obtain the output. According to the circuit with this configuration, a characteristic similar to that when switching is carried out using a sine wave can be obtained by suitably setting the gain of the mixers and the phase difference between the clock signals. The principle of operation of the harmonic wave removing mixer circuit is described in U.S. Pat. No. 7,519,348. The harmonic wave removing mixer circuit can be configured using known circuit elements and so forth.

A plurality of clock signals having different phases from each other are inputted to the harmonic wave removing mixer circuit. The number of such clock signals may be set suitably in accordance with the design of the harmonic wave removing mixer circuit. For example, in the case where a voltage controlled oscillator (VCO) is used to generate the clock signals, from a point of view of suppression of the circuit scale and noise reduction, the number of clock signals preferably is a power of 2.

In the configuration wherein an output of an analog signal circuit is connected to the connection node, if the apparatus on the reception side further includes an analog reception part for receiving an analog signal, then parallel transmission by digital communication and analog communication can be carried out. Since such a configuration as just described enhances the possibility that, even if some failure occurs, the communication may be maintained, the reliability of the transmission and reception system can be enhanced.

For example, if a transmission and reception apparatus according to an embodiment of the present disclosure is used, then a transmission and reception system can be configured in which bidirectional communication can be carried out by a wire or wireless transmission line such as a coaxial cable or a wireless network. It is to be noted that, in the case where a transmission and reception system is configured to carry out communication in one direction, for example, the transmission side may be configured to have only the transmission part or transmission apparatus while the reception side has only the reception part or reception apparatus.

Various conditions specified in the present specification are considered to be satisfied not only when they are satisfied strictly but also when they are satisfied substantially. Presence of various dispersions which may appear upon design or upon fabrication is allowable.

First Embodiment

The first embodiment according to the present disclosure relates to a transmission and reception apparatus and a transmission and reception system.

FIG. 1 shows a functional block diagram of the transmission and reception system which uses the transmission and reception apparatus according to the first embodiment.

Referring to FIG. 1, the transmission and reception system 1 is configured from a pair of transmission and reception apparatus 100, particularly transmission and reception apparatus 100A and 100B, and allows bidirectional communication through a transmission line 110 formed, for example, from a coaxial cable. The transmission and reception apparatus 100A has a connection node ND_A while the transmission and reception apparatus 100B has a connection node ND_B. The connection node ND_A and the connection node ND_B are connected to each other through the transmission line 110.

Operation when communication is carried out from the transmission and reception apparatus 100A toward the transmission and reception apparatus 100B and operation when communication is carried out from the transmission and reception apparatus 100B toward the transmission and reception apparatus 100A are basically the same as each other. Therefore, in the following description, operation when a transmission signal from the transmission and reception apparatus 100A is received by the transmission and reception apparatus 100B is described.

It is to be noted that, for the convenience of illustration, application of reference characters is omitted with regard to components in a reception part 102 of the transmission and reception apparatus 100A described hereinafter. Further, in the case where there is no necessity to distinguish the transmission and reception apparatus 100A and 100B from each other, each of them is represented simply as transmission and reception apparatus 100. This also applies to the other embodiments hereinafter described.

The transmission and reception apparatus 100 is configured from a transmission part or transmission apparatus 101 and a reception part or reception apparatus 102. The transmission part 101 includes a D/A converter 14 which outputs a digitally modulated signal, and it outputs the output of the D/A converter 14 as it is as a transmission signal. In the example shown in FIG. 1, the output side of the D/A converter 14 of the transmission and reception apparatus 100A is connected directly to the connection node ND_A while the output side of the D/A converter 14 of the transmission and reception apparatus 100B is connected directly to the connection node ND_B.

The transmission part 101 which configures the transmission and reception apparatus 100A is described in detail below with reference to FIG. 1. In the example shown in FIG. 1, a signal that has passed through an amplifier 11, an A/D converter 12 and a logic circuit 13 is inputted to the D/A converter 14.

An analog video signal VsigA sent from an image pickup apparatus not shown is amplified by the amplifier 11 and then converted into a digital signal by the A/D converter 12. The logic circuit 13 is, for example, an interface circuit between the A/D converter 12 and the D/A converter 14 and carries out suitable digital signal processing. The D/A converter 14 carries out sampling based on a predetermined clock signal Fclk and outputs, for example, a quadrature phase modulated analog signal. Although the frequency of the clock signal Fclk may be suitably set in accordance with specifications of the transmission and reception apparatus, it may have a value of about 100 [MHz].

As described hereinabove, the D/A converter 14 carries out sampling based on the clock signal Fclk. Therefore, if the carrier to be generated is represented by reference character Ftx_A, then also a folded signal (Fclk−Ftx_A) is outputted together with a carrier Ftx_A from the output side of the D/A converter 14.

As regards the transmission part 101 configuring the transmission and reception apparatus 100B shown in FIG. 1, the description given above may be read replacing the names of elements suitably. In particular, the "analog video signal Vsig_A" may be read as "analog video signal Vsig_B," and the "carrier Ftx_A" may be read as "carrier Ftx_B." For example, in the transmission part 101 configuring the transmitssion and reception apparatus 100B, a folded signal (Fclk−Ftx_B) is outputted together with a carrier Ftx_B from the output side of the D/A converter 14.

Now, the reception part 102 which configures the transmission and reception apparatus 100 is described. The reception part 102 includes a receiving section 20 including a harmonic wave removing mixer circuit and a filter circuit for selecting a reception signal from within the output of the harmonic wave removing mixer circuit.

The reception part 102 which configures the transmission and reception apparatus 100B is described more particularly with reference to FIG. 1. The receiving section 20 has a configuration of the direct conversion type and is configured from a quadrature modulator or demodulator for converting information on an IQ plane into a high frequency signal. An I modulator includes a harmonic wave removing mixer circuit 21 and a filter circuit 26. An output of the filter circuit 26 is amplified by an amplifier 27 and then converted into a digital signal by an A/D converter 28. Similarly, a Q modulator includes a harmonic wave removing mixer circuit 31 and a filter circuit 36. An output of the filter circuit 36 is amplified by an amplifier 37 and then converted into a digital signal by an A/D converter 38.

The harmonic wave removing mixer circuits 21 and 31 have a frequency down conversion function for a transmission signal inputted thereto from the outside. Since the I modulator and the Q modulator have a basically similar configuration, the configuration of the harmonic wave removing mixer circuit 21 and so forth which configure the I modulator is described in detail.

The harmonic wave removing mixer circuit 21 is configured, in the example shown in FIG. 1, from three mixers 22, 23 and 24. The mixers 22, 23 and 24 are connected on the input side thereof, or in other words, on the input side of the harmonic wave removing mixer circuit 21, to the connection node ND_B of the transmission and reception apparatus 100B.

As described above, in the transmission and reception apparatus 100, the output section of the transmission part 101 and the input section of the reception part 102 are connected to the same connection node. To the harmonic wave removing mixer circuit 21, a transmission signal from the transmission and reception apparatus 100A is inputted through the wire transmission line 110.

The mixers 22, 23 and 24 are set so as to have predetermined gain characteristics different from each other and operate based on clock signals having a same frequency but having different phases from each other. In particular, a multiphase generator 41 generates three clock signals having the same frequency but having different phases from each other based on a reference clock signal from a reference clock apparatus 42. The clock signals of different phases are respectively inputted to the mixers 22, 23 and 24 through signal lines 43 so that the mixers 22, 23 and 24 are switched. Outputs of the mixers 22, 23 and 24 are added to be an output signal I_out by an addition section 25. By suitably setting the gain of the mixers and the phase difference between the clock signals, a characteristic similar to that obtained by switching with a sine wave can be obtained. A predetermined reception signal selected by the filter circuit 26 from within the output signal I_out is converted into a digital signal by the A/D converter 28 through the amplifier 27.

It is to be noted that, as described hereinabove, in the case where a clock signal is generated, for example, using a VCO, from the point of view of suppression of the circuit scale and noise reduction, the number of clock signals of different phases, or in other words, the number of mixers, preferably is a power of 2. In this manner, the number of mixers is not limited to three but may be set suitably in accordance with the design of the harmonic wave removing mixer circuit.

As regards the configuration and the operation of the Q modulator, the foregoing description may be read suitably. In particular, the harmonic wave removing mixer circuit 21 may be read as harmonic wave removing mixer circuit 31; the mixers 22, 23 and 24 as mixers 32, 33 and 34; the filter circuit 26 as filter circuit 36, the amplifier 27 as amplifier 37; and the A/D converter 28 as A/D converter 38. Such a configuration, for example, that an image is displayed by a known display unit based on data from the A/D converter 28 or 38 may be adopted. It is to be noted that, for the convenience of illustration, elements such as a display unit as described above are omitted in FIG. 1 and so forth. This similarly applies also to the other embodiments.

Here, in order to facilitate understandings of the disclosure, a problem in the case where a mixer circuit of a simple configuration is used in place of the harmonic wave removing mixer circuit 21 or 31 is described.

Figure 2:
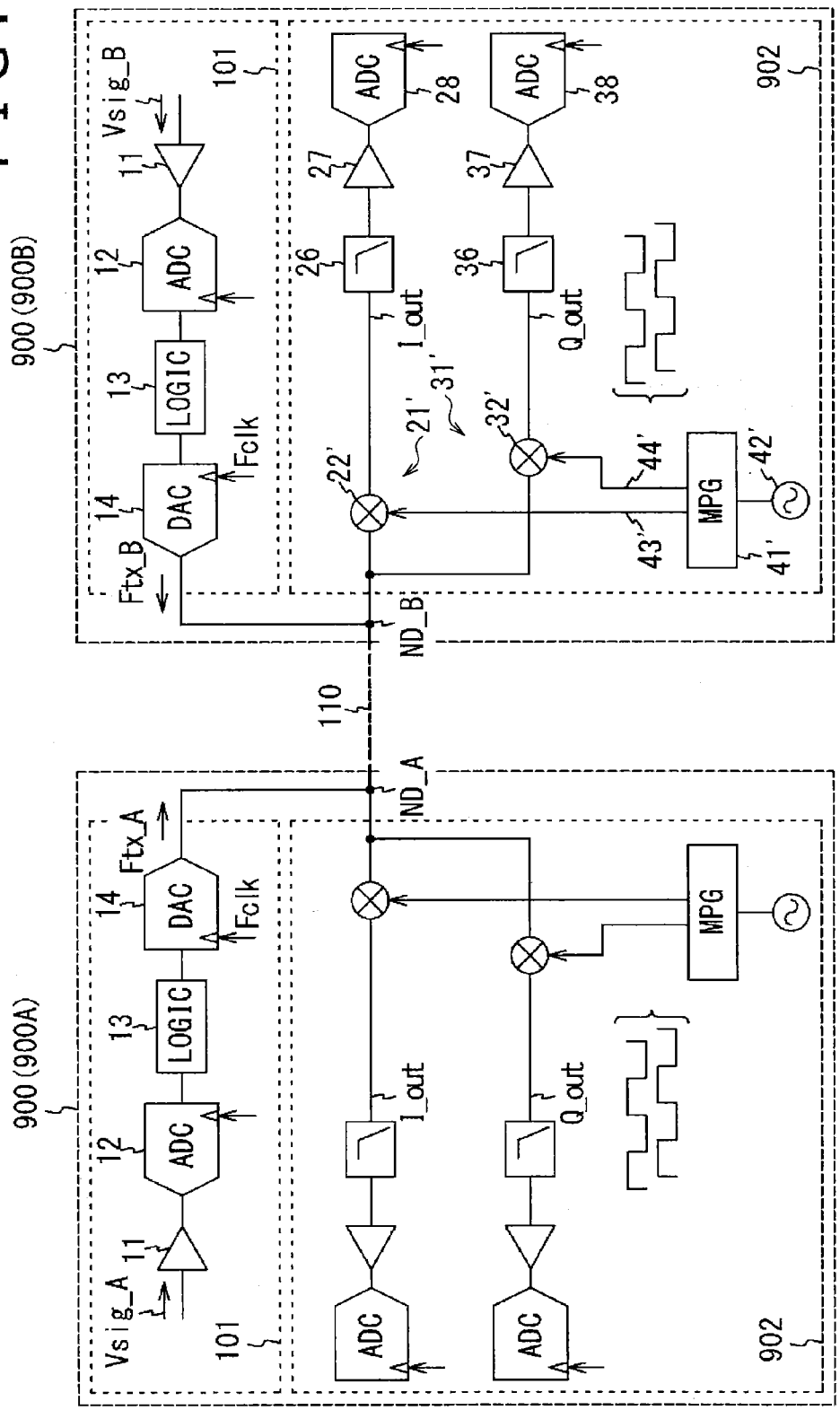
FIG. 2 is a functional block diagram of a transmission and reception system of a reference example for explaining a problem in the case where a mixer circuit of the direct conversion type having a simple configuration is used.

FIG. 2 shows a functional block diagram of a transmission and reception system of a reference example for illustrating the problem in the case where a mixer circuit of the direct conversion type having a simple configuration is used.

Referring to FIG. 2, each of transmission and reception apparatus 900, that is, each of transmission and reception apparatus 900A and 900B, in the transmission and reception system of the reference example is configured such that the reception part 102 in the transmission and reception apparatus 100, that is, in the transmission and reception apparatus 100A and 100B, is replaced by a reception part 902. Since the other components of the transmission and reception apparatus 900 are similar to those described hereinabove with reference to FIG. 1, description of the components other than the reception part 902 is omitted herein to avoid redundancy.

The reception part 902 is of the direction conversion type, and an I modulator includes a mixer circuit 21' and a filter circuit 26 while a Q modulator includes a mixer circuit 31' and a filter circuit 36. Since the I modulator and the Q modulator have a basically similar configuration, the configuration of the mixer circuit 21' and so forth which configure the I modulator are described in detail.

The mixer circuit 21' is configured from a single mixer 22'. A clock signal based on a reference clock signal from a reference clock apparatus 42' is generated by a multiphase generator 41' and inputted to the mixer 22' through a signal line 43'.

Figure 3A:
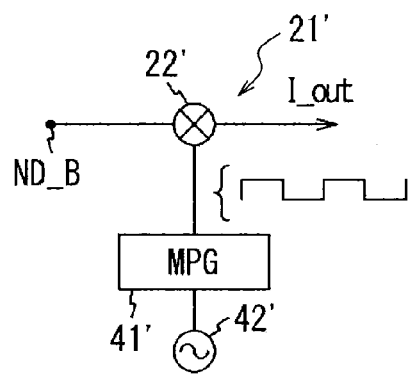
FIG. 3A is a schematic view showing a configuration of a mixer circuit of the direct conversion type having a simple configuration.
Figure 3B:
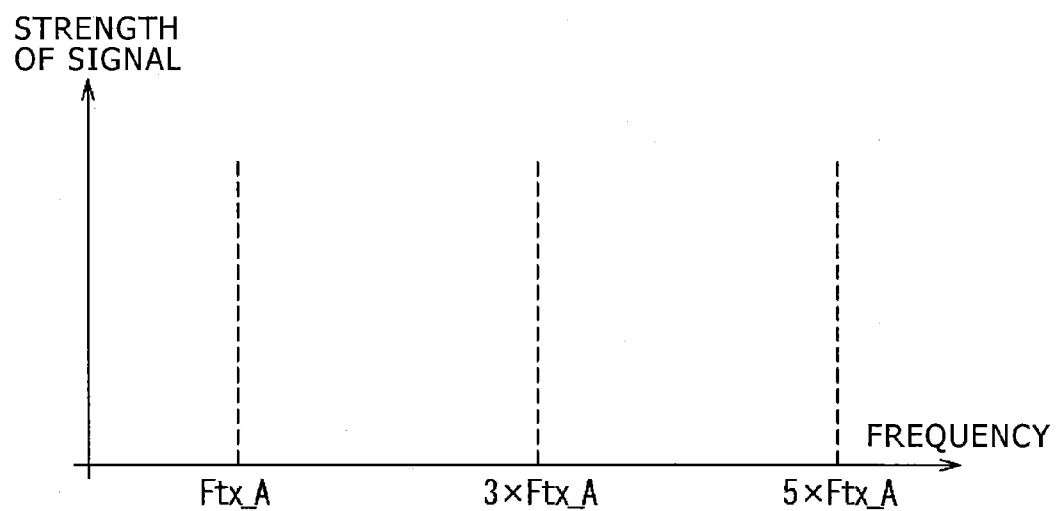
FIG. 3B is a schematic graph illustrating a spectrum of an output of the mixer circuit.

FIG. 3A illustrates operation of a mixer circuit configured from a single mixer, and FIG. 3B illustrates a spectrum of an output of the mixer circuit.

The mixer 22' is switched with a rectangular wave of a frequency to be received, which is equal to that of the carrier Ftx_A, based on the clock signal from the reference clock apparatus 42'. Although the frequency of the carrier is set suitably in accordance with specifications of the transmission and reception apparatus, it may have a value of about 100 [MHz].

The rectangular wave includes odd-order harmonics. Accordingly, a mixer circuit of the direct conversion type down converts also frequencies of odd multiples of a frequency to be received such as frequencies of three times, five times and so forth. If an output of the mixer circuit 21' is represented by a spectrum diagram, then this is represented as seen in FIG. 3B.

Here, the spectrums of signals at the connection node ND_B shown in FIG. 2 are described with reference to FIGS. 4A and 4B.

Figure 4A:
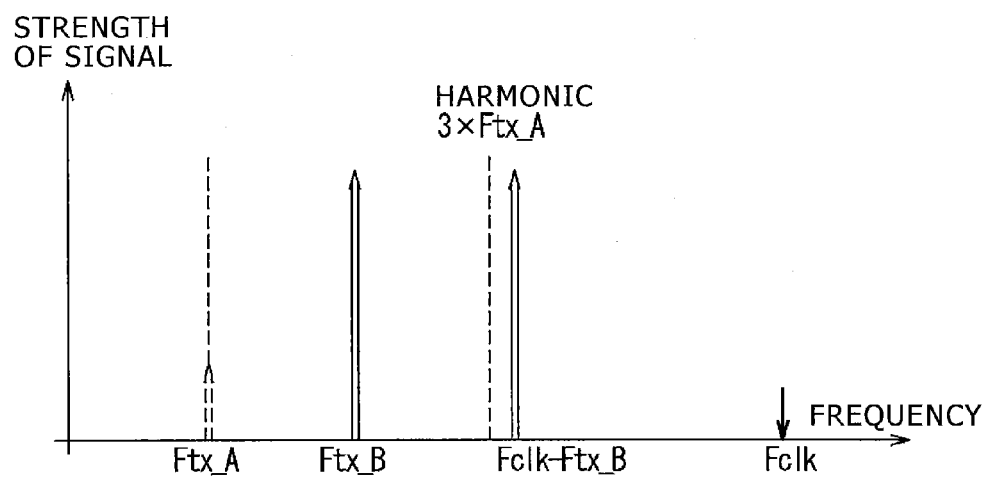
FIG. 4A is a schematic graph illustrating a spectrum of a signal at a connection node shown in FIG. 2.

FIG. 4A is a schematic graph illustrating spectrums of signals at the connection node ND_B shown in FIG. 2. FIG. 4B is a schematic graph illustrating a characteristic of a filter required to reduce the influence of a folded signal.

To the connection node ND_B, a transmission signal from the transmission and reception apparatus 900A whose carrier is represented by reference character Ftx_A, and a transmission signal from the transmission and reception apparatus 900B whose carrier is represented by reference character Ftx_B are applied in an overlapping relationship. Here, since the transmission signal from the transmission and reception apparatus 900A is attenuated when it is transmitted through the transmission line 110, the carrier Ftx_B is higher in strength than the carrier Ftx_A. Further, also a folded signal (Fclk−Ftx_B) is outputted in the transmission signal of the transmission and reception apparatus 900B. As a result, an outline of the spectrum of the signal at the connection node ND_B is represented as seen in FIG. 4A.

For example, if the frequency of three times that of the carrier Ftx_A is equal to or proximate to the frequency of the folded signal (Fclk−Ftx_B), then the mixer circuit 21' of the transmission and reception apparatus 900B down converts the folded signal (Fclk−Ftx_B) together with the carrier Ftx_A to be received, and therefore, an error signal is generated. It is to be noted that, if the attenuation in the transmission line 110 is little, a similar problem arises from the folded signal (Fclk−Ftx_A).

Figure 4B:
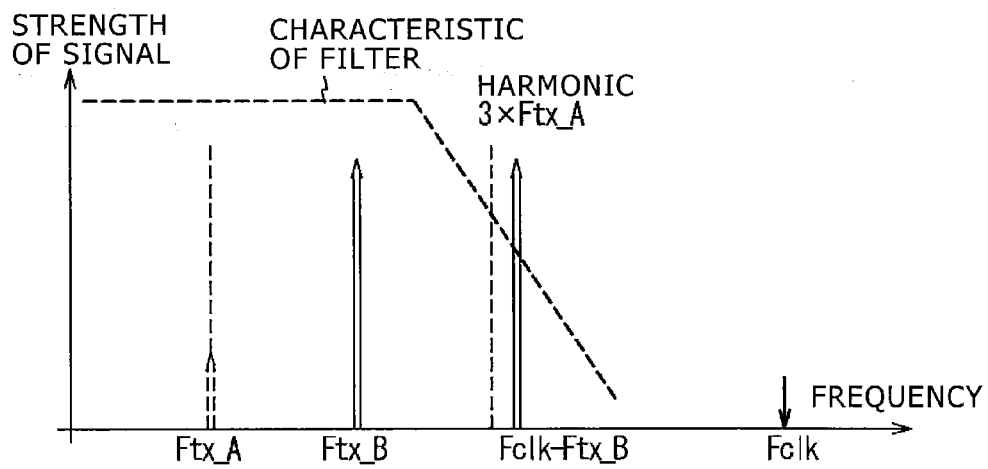
FIG. 4B is a schematic graph illustrating a required characteristic of a filter to reduce influence of a folded signal.
Figure 5:
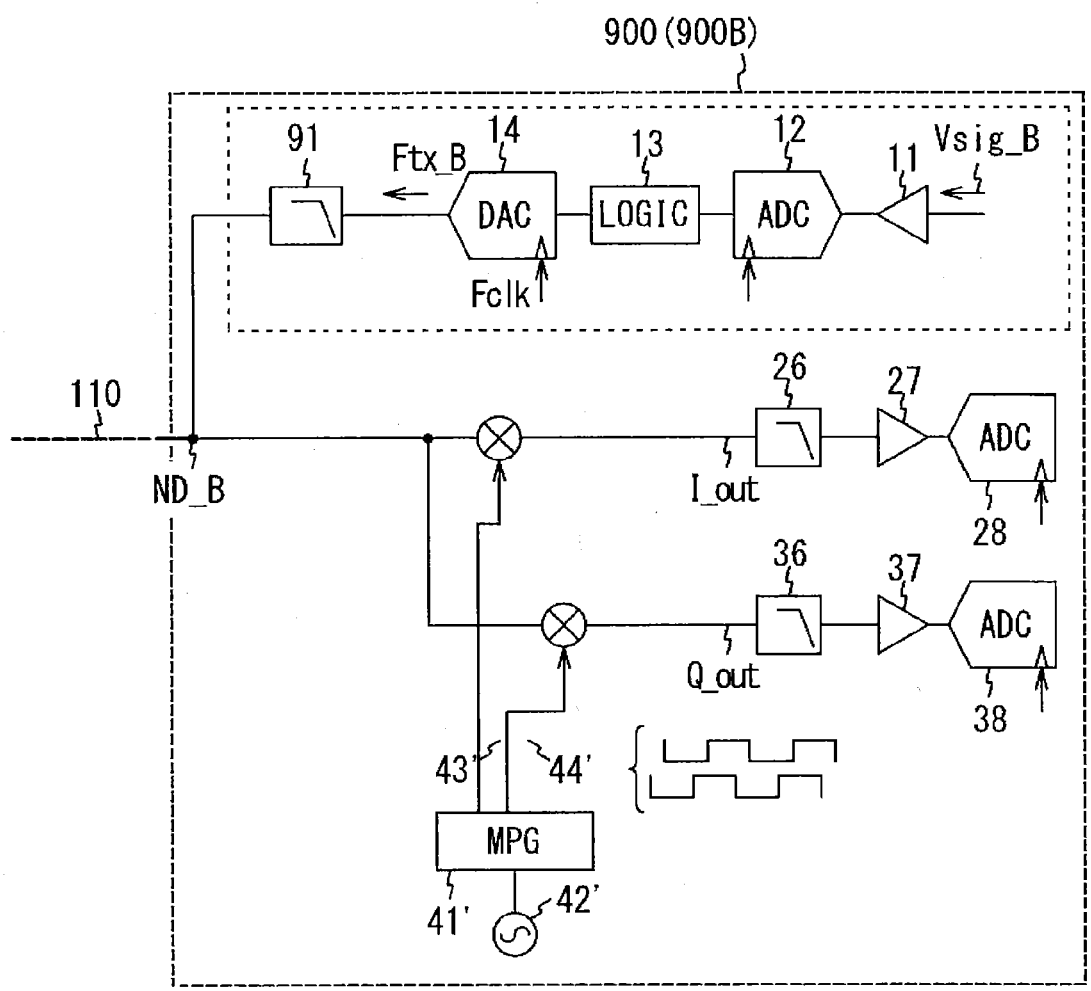
FIG. 5 is a functional block diagram of a transmission and reception apparatus of a reference example which includes an anti-aliasing filter.

In order to avoid down conversion of the folded signal (Fclk−Ftx_B), a low-pass filter that has a sufficient attenuation characteristic in the proximity of a frequency equal to three times that of the carrier Ftx_A is used to thereby attenuate the folded signal (Fclk−Ftx_B) to be transmitted to the connection node ND_B, as seen in FIG. 4B.

Accordingly, in the case where a mixer circuit of the direction conversion type of a simple configuration is used, a low-pass filter (anti-aliasing filter) 91 as described hereinabove is provided on the output side of the D/A converter 14 of the transmission and reception apparatus 900.

The problem in the case where the mixer circuit of the simple configuration is used has been described. In the transmission and reception apparatus 100 according to the first embodiment, since a harmonic wave removing mixer circuit is used, down conversion of the folded signal (Fclk–Ftx_B) does not occur. Description is given below with reference to FIGS. 6A and 6B.

Figure 6A:
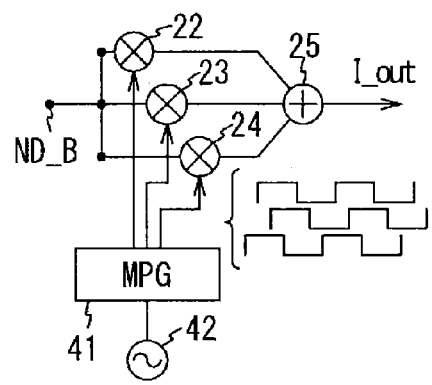
FIG. 6A is a schematic view showing a configuration of a harmonic wave removing mixer circuit.
Figure 6B:
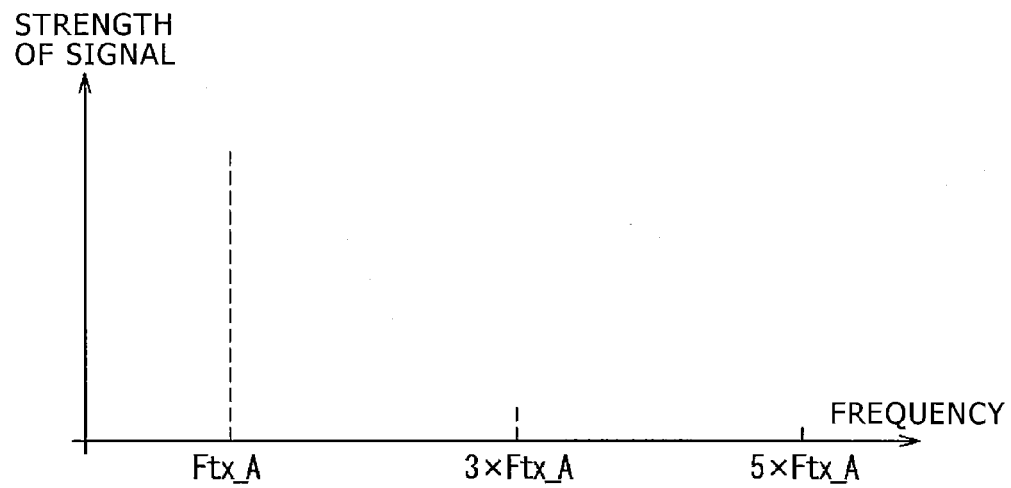
FIG. 6B is a schematic graph illustrating a spectrum of an output of the harmonic wave removing mixer circuit.

FIG. 6A shows a configuration of the harmonic wave removing mixer circuit. FIG. 6B is a schematic graph illustrating an output spectrum of the harmonic wave removing mixer circuit.

As described hereinabove, in the harmonic wave removing mixer circuit 21 shown in FIG. 6A, outputs of the mixers 22, 23 and 24 are added into an output signal such as a signal I_out by the addition section 25. By suitably setting the gain of the mixers and the phase difference between the clock signals, a characteristic similar to that obtained by switching with a sine wave can be obtained.

The output spectrums of the harmonic wave removing mixer circuit 21 will be represented as shown in FIG. 6B. Since the responsibility to odd-order harmonics of the carrier Ftx_A is low as indicated in the figure, even if the frequency equal to three times that of the carrier Ftx_A and the frequency of the folded signal (Fclk–Ftx_B) are equal or proximate to each other, such a situation that the folded signal (Fclk–Ftx_B) is down converted can be avoided. Accordingly, in the transmission and reception apparatus 100 according to the first embodiment, even if the output of the D/A converter 14 is outputted as it is as a transmission signal, communication can be carried out favorably.

Second Embodiment

The second embodiment of the present disclosure also relates to the transmission and reception apparatus and the transmission and reception system. The second embodiment is different from the first embodiment principally in that the transmission part transmits two transmission signals having carries of different frequencies from each other while the reception part includes a first receiving section which receives a first reception signal and a second receiving section for receiving a second reception signal different from the first reception signal.

By differentiating the frequencies of carriers of digitally modulated signals, a plurality of signals can be transmitted by the same coaxial cable. Accordingly, if the transmission and reception apparatus are configured such that they include a first receiving section which receives a first reception signal and a second receiving section for receiving a second reception signal different from the first reception signal, then increase of the transmission rate can be achieved.

Figure 7:
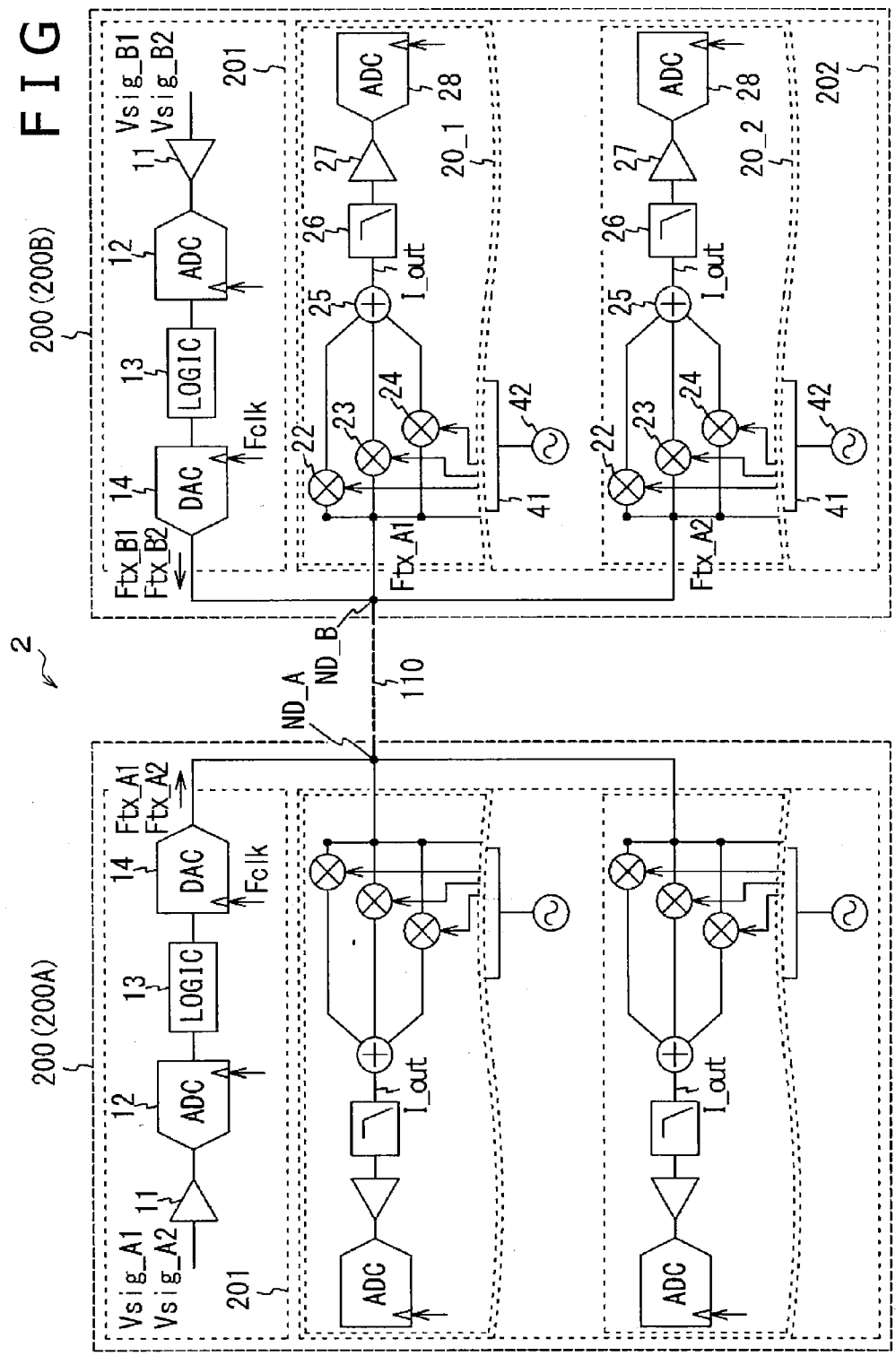
FIG. 7 is a functional block diagram of a transmission and reception system which uses a transmission and reception apparatus according to a second embodiment.

FIG. 7 is a functional block diagram of the transmission and reception system which uses the transmission and reception apparatus according to the second embodiment.

This transmission and reception system 2 is as well configured from a pair of transmission and reception apparatus 200, that is, from transmission and reception apparatus 200A and 200B and can carry out bidirectional communication through a transmission line 110 formed, for example, from a coaxial cable. The transmission and reception apparatus 200A has a connection node ND_A while the transmission and reception apparatus 200B has a connection node ND_B. Similarly as in the first embodiment, the connection node ND_A and the connection node ND_B are connected to each other by the transmission line 110.

Operation when communication is carried out from the transmission and reception apparatus 200A toward the transmission and reception apparatus 200B and operation when communication is carried out from the transmission and reception apparatus 200B toward the transmission and reception apparatus 200A are basically the same as each other. Therefore, in the following description, operation when a transmission signal from the transmission and reception apparatus 200A is received by the transmission and reception apparatus 200B is described.

Each of the transmission and reception apparatus 200 is configured from a transmission part 201 and a reception part 202. The transmission part 201 has a configuration different from that of the transmission part 101 described hereinabove in connection with the first embodiment in that it transmits two transmission signals of different carriers.

The transmission part 201 which configures the transmission and reception apparatus 200A is described in more detail with reference to FIG. 7. In the example shown in FIG. 7, two different analog video signals Vsig_A1 and Vsig_A2 sent thereto from an image pickup apparatus not shown are inputted to the D/A converter 14 through the amplifier 11, A/D converter 12 and logic circuit 13. The D/A converter 14 carries out sampling based on a predetermined clock signal and outputs two digitally modulated signals whose carriers have different frequencies corresponding to the analog video signals Vsig_A1 and Vsig_A2. The carriers of the digitally modulated signals corresponding to the analog video signals Vsig_A1 and Vsig_A2 are represented by reference characters Ftx_A1 and Ftx_A2, respectively.

As regards the transmission part 201 which configures the transmission and reception apparatus 200B shown in FIG. 7, the foregoing description may be read suitably, and therefore, description of the transmission part 201 is omitted herein. For example, in the transmission part 201 which configures the transmission and reception apparatus 200B, digitally modulated signals of carriers Ftx_B1 and Ftx_B2 are transmitted from the output side of the D/A converter 14.

Now, the reception part 202 which configures the transmission and reception apparatus 200 is described. The reception part 202 includes at least a first receiving section 20_1 for receiving a first reception signal and a second receiving section 202 for receiving a second reception signal different from the first reception signal. In the example of FIG. 7, the first reception signal is the digitally modulated signal of the carrier Ftx_A1, and the second reception signal is the digitally modulated signal of the carrier Ftx_A2.

The reception part 202 which configures the transmission and reception apparatus 200B is described in more detail with reference to FIG. 7. The reception part 202 is basically configured to include two receiving sections 20 described hereinabove with reference to FIG. 1. The two receiving sections 20_1 and 20_2 have a configuration basically similar to that of the receiving section 20 described hereinabove in connection with the first embodiment, and therefore, overlapping description of the same is omitted herein to avoid redundancy.

Figure 8:
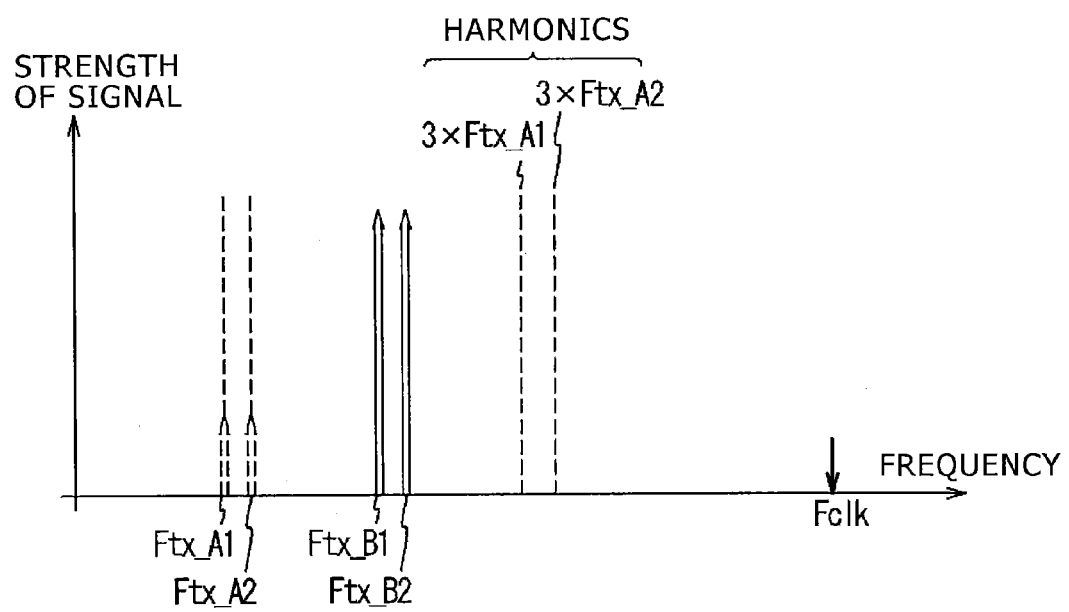
FIG. 8 is a schematic graph illustrating a spectrum of a signal at a connection node shown in FIG. 7.

FIG. 8 is a schematic graph illustrating spectrums of signals at the connection node ND_B. It is to be noted that, in FIG. 8, a folded signal of the transmission part 201 is omitted.

Since the receiving sections 20_1 and 20_2 have a configuration including a harmonic wave removing mixer circuit, such a situation that they down convert a folded signal does not occur. Accordingly, they are advantageous in that the limitation to selection of frequencies for the carriers Ftx_A1, Ftx_A2, Ftx_B1 and Ftx_B2 is moderated and hence the arrangement of frequencies is facilitated and besides simplification of the system can be anticipated.

It is to be noted that, while each of the transmission and reception apparatus in the example described above carries out communication using two transmission signals of carries having different frequencies from each other, it may otherwise be configured such that three or more transmission signals are used for communication. In this manner, according to the second embodiment, a higher transmission rate can be anticipated.

Third Embodiment, Others

The third embodiment of the present disclosure also relates to the transmission and reception apparatus and the transmission and reception system. The third embodiment is different from the first embodiment principally in that an output of an analog signal circuit is connected to a connection node and that an analog reception part for receiving an analog signal is provided.

If the frequency of a carrier of a digitally modulated signal does not overlap with the frequency of, for example, an analog video signal, then the signals can be transmitted at the same time by the same coaxial cable without any trouble.

Figure 9:
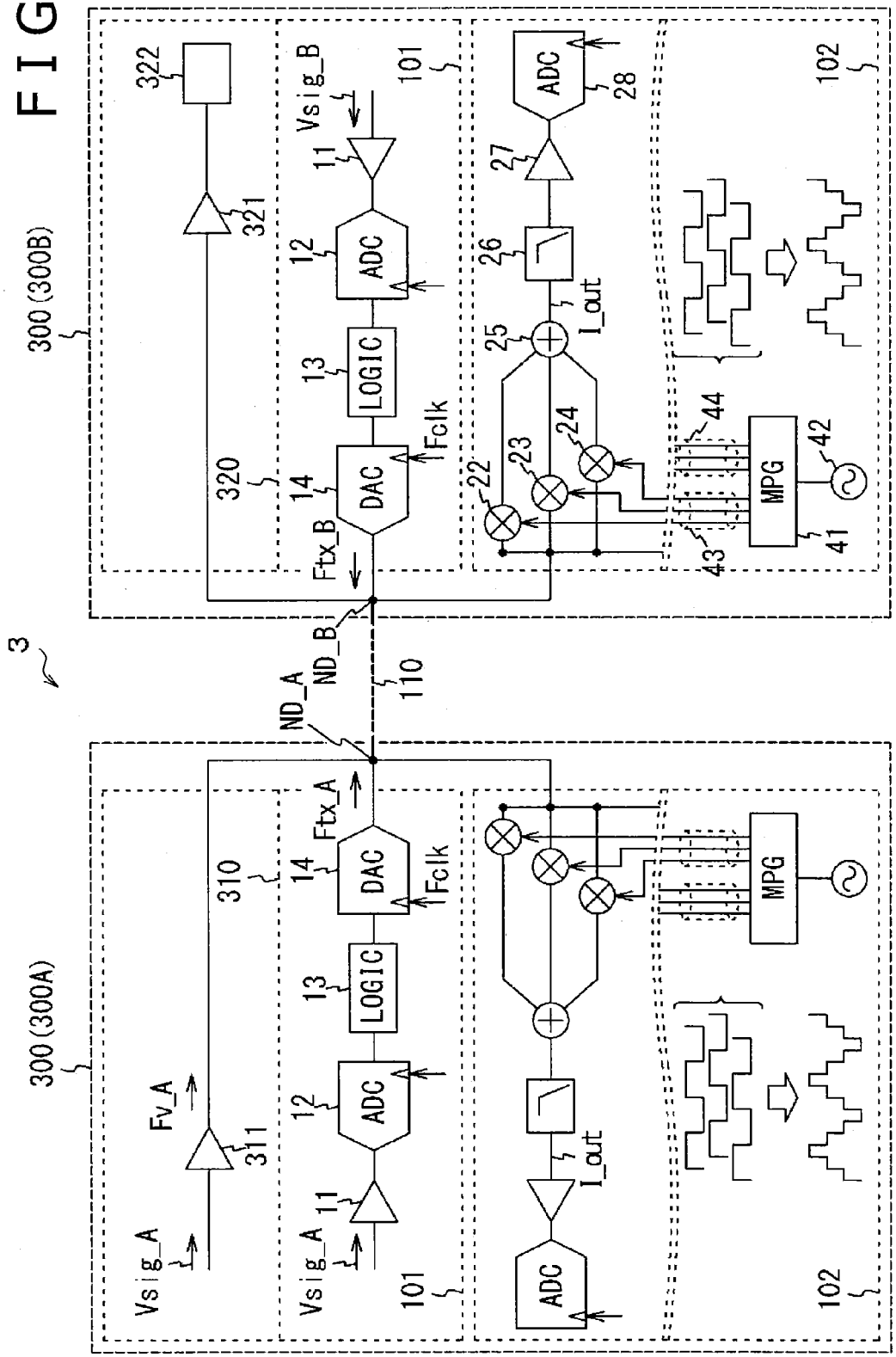
FIG. 9 is a functional block diagram of a transmission and reception system which uses a transmission and reception apparatus according to a third embodiment.

FIG. 9 is a functional block diagram of the transmission and reception system which uses the transmission and reception apparatus according to the third embodiment.

This transmission and reception system 3 is as well configured from a pair of transmission and reception apparatus 300, that is, from transmission and reception apparatus 300A and 300B and allows bidirectional communication through a transmission line 110 formed, for example, from a coaxial cable. The transmission and reception apparatus 300A has a connection node ND_A while the transmission and reception apparatus 300B has a connection node ND_B. Similarly as in the first embodiment, the connection node ND_A and the connection node ND_A are connected to each other by the transmission line 110.

The transmission and reception apparatus 300A is configured such that the transmission and reception apparatus 100A shown in FIG. 1 additionally includes a transmission part 310. Meanwhile, the transmission and reception apparatus 300B is configured such that the transmission and reception apparatus 100B shown in FIG. 1 additionally includes a reception part 320.

The transmission part 310 additionally provided in the transmission and reception apparatus 300A includes an amplifier 311 to which an analog video signal Vsig_A is inputted. The output side of the amplifier 311 is connected to the connection node ND_A. In this manner, an output of an analog signal circuit which carries out, for example, base band transmission is connected. It is to be noted that the output signal of the amplifier 311 is represented by reference character Fv_A.

Meanwhile, the reception part 320 additionally provided in the transmission and reception apparatus 300B includes an amplifier 321 to which an analog signal Fv_A is inputted. The output side of the amplifier 321 is connected, for example, to a display apparatus 322.

Figure 10:
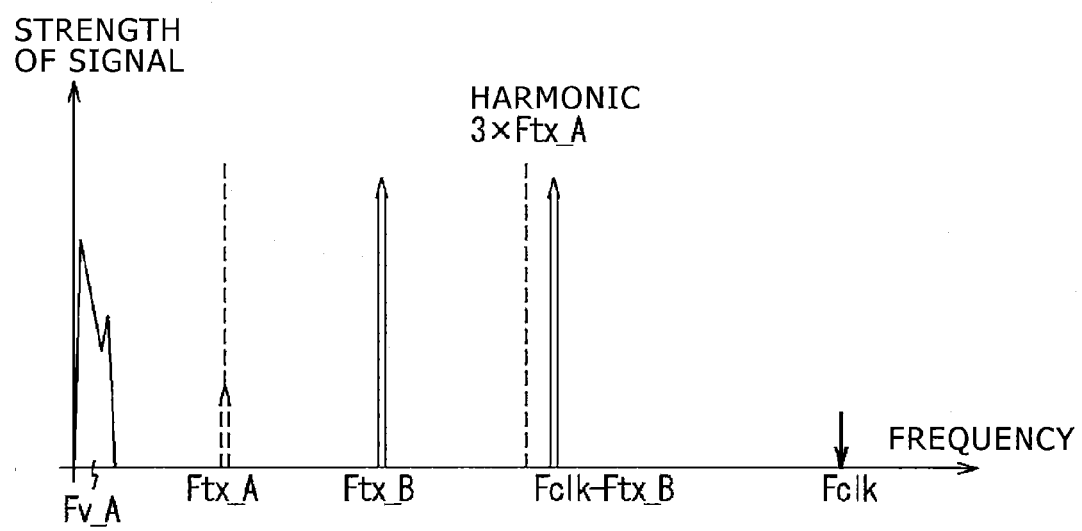
FIG. 10 is a schematic graph illustrating a spectrum of a signal at a connection node shown in FIG. 10.

FIG. 10 is a schematic graph illustrating spectrums of signals at the connection node ND_B shown in FIG. 9.

In the case where the analog signal Fv_A is a video signal transmitted by base band transmission, generally it has a frequency of around several megahertz. Accordingly, the frequency is sufficiently lower than that of the carrier of a digitally modulated signal. Therefore, if the reception setting of the display apparatus 322 is set suitably, video of the analog signal Fv_A can be received without any trouble.

In the transmission and reception system 3 shown in FIG. 9, bidirectional communication using a digitally modulated signal can be carried out similarly as described hereinabove with reference to FIG. 1. In addition, communication using an analog signal can also be carried out. Accordingly, even if some trouble occurs, the possibility of maintaining communication can be enhanced, and consequently, the reliability of the transmission and reception system can be enhanced.

It is to be noted that, while, in the example shown in FIG. 9, communication by an analog video signal is carried out in one direction from the transmission and reception apparatus 300A to the transmission and reception apparatus 300B, this configuration is merely illustrative. For example, if each of the transmission and reception apparatus 300 is configured to include both of the transmission part 310 and the reception part 320, then the transmission and reception system can achieve bidirectional communication by an analog video signal as well.

While embodiments of the present disclosure have been described specifically, the present disclosure is not limited to the embodiments described above but can be altered and modified in various manners based on the technical spirit and scope of the disclosure.

It is to be noted that embodiments of the technology of the present disclosure may also have such configurations as described below.

(1) A transmission and reception apparatus, comprising: a transmitting part configured to produce an output signal including a first digitally modulated signal; and a receiving part comprising a mixer circuit, the receiving part being configured to receive an input signal including a second digitally modulated signal, the mixer circuit being configured to perform frequency down conversion on the input signal to produce a frequency-down-converted input signal.

(2) The apparatus according to (1), wherein the receiving part further comprises a filter circuit, the filter circuit being configured to receive the frequency-down-converted input signal from the mixer circuit and select a predetermined reception signal from the frequency-down-converted input signal.

(3) The apparatus according to (1), wherein the mixer circuit is configured to perform a harmonic wave removal function on the input signal, the harmonic wave removal function reducing the presence of a folding signal from the input signal, the folding signal being present as a function of the first digitally modulated signal and a clock signal used to produce the first digitally modulated signal.

(4) The apparatus according to (3), wherein the harmonic wave removal function reduces, from the input signal, signals proximate to three times a frequency of the second digitally modulated signal to reduce the presence of the folding signal.

(5) The apparatus according to (4), wherein the input signal and the output signal are input and output via a common node of the transmission and reception apparatus.

(6) The apparatus according to (5), wherein the input signal and the output signal are input and output through a transmission line connected to the common node, the input signal having been produced as output by a counterpart transmission and reception apparatus.

(7) The apparatus according to (3), wherein the input signal is produced as output by a counterpart transmission and reception apparatus that provides the input signal without passage through a low pass filter, and the harmonic wave removal function reduces the presence of the folding signal from the input signal despite the absence of the low pass filter.

(8) The apparatus according to (1), wherein the mixer circuit comprises a plurality of mixers respectively receiving clock signals having a same frequency and different phases.

(9) The apparatus according to (1), wherein the mixer circuit is one of a plurality of mixer circuits, a first mixer circuit providing a first component of the input signal and a second mixer circuit providing a second component of the input signal.

(10) The apparatus according to (9), wherein the first component comprises an in-phase (I) signal and the second component comprises a quadrature-phase (Q) signal.

(11) The apparatus according to claim (10), wherein the first component comprises a first transmission signal having a first carrier frequency and the second component comprises a second transmission signal having a second carrier frequency.

(12) The apparatus according to (2), wherein the mixer circuit is one of a plurality of mixer circuits, and the filter circuit is one of a plurality of filter circuits, a first mixer circuit/filter circuit pair providing a first component of the input signal and a second mixer circuit/filter circuit pair providing a second component of the input signal.

(13) The apparatus according to (3), wherein the input signal further comprises an analog content signal, and the harmonic wave removal function reduces the presence of the folding signal without disturbing the analog content signal.

(14) The apparatus according to (13), wherein the analog content signal is an analog video signal.

(15) A system for transmitting and receiving signals, the system comprising: a first transmission and reception apparatus comprising: a transmitting part configured to produce a first output signal including a first digitally modulated signal; and a second transmission and reception apparatus comprising: a transmitting part configured to produce a second output signal including a second digitally modulated signal, and a receiving part comprising a mixer circuit, the receiving part being configured to receive as an input signal the first output signal including the first digitally modulated signal, the mixer circuit being configured to perform frequency down conversion on the input signal to produce a frequency-down-converted input signal.

(16) The system according to (15), wherein the mixer circuit is configured to perform a harmonic wave removal function on the input signal, the harmonic wave removal function reducing the presence of a folding signal from the input signal, the folding signal being present as a function of the second digitally modulated signal and a clock signal used to produce the second digitally modulated signal.

(17) The system according to (16), wherein the harmonic wave removal function reduces, from the input signal, signals proximate to three times a frequency of the first digitally modulated signal to reduce the presence of the folding signal.

(18) The system according to (16), wherein the first transmission and reception apparatus outputs the first output signal without passage through a low pass filter, and the harmonic wave removal function reduces the presence of the folding signal from the input signal despite the absence of the low pass filter.

(19) The system according to (15), wherein the mixer circuit is one of a plurality of mixer circuits, a first mixer circuit providing a first component of the input signal and a second mixer circuit providing a second component of the input signal.

(20) The system according to (19), wherein the first component comprises an in-phase (I) signal and the second component comprises a quadrature-phase (Q) signal.

(21) The system according to (19), wherein the first component comprises a first transmission signal having a first carrier frequency and the second component comprises a second transmission signal having a second carrier frequency.

(22) The system according to (16), wherein the first output signal further comprises an analog content signal, and the harmonic wave removal function reduces the presence of the folding signal without disturbing the analog content signal.

(23) A method for transmitting and receiving signals, the method comprising: producing an output signal including a first digitally modulated signal; and receiving, by a mixer circuit, an input signal including a second digitally modulated signal, the mixer circuit being configured to perform frequency down conversion on the input signal to produce a frequency-down-converted input signal.

(24) The method according to (23), further comprising: performing, by the mixer circuit, a harmonic wave removal function on the input signal, the harmonic wave removal function reducing the presence of a folding signal from the input signal, the folding signal being present as a function of the first digitally modulated signal and a clock signal used to produce the first digitally modulated signal.

(25) A transmission and reception apparatus, including: a transmission part; and a reception part, the transmission part including a D/A converter operative to output a digitally modulated signal and outputting an output of the D/A converter as it is as a transmission signal, the reception part including a receiving section which in turn includes a harmonic wave removing mixer circuit having a frequency down conversion function of a transmission signal inputted thereto from the outside, and a filter circuit configured to select a reception signal from within an output of the harmonic wave removing mixer circuit.

(26) The transmission and reception apparatus according to (25), wherein an output section of the transmission part and an input section of the reception part are connected to the same connection node.

(27) The transmission and reception apparatus according to (25) or (26), wherein the harmonic wave removing mixer circuit includes a plurality of mixers and carries out, by the mixers respectively receiving clock signals having different phases from each other, frequency down conversion of the transmission signal inputted thereto from the outside.

(28) The transmission and reception apparatus according to (27), wherein the number of the clock signals having different phases is a power of 2.

(29) The transmission and reception apparatus according to any one of (25) to (28), wherein the transmission signal is inputted from the outside through a transmission line.

(30) The transmission and reception apparatus according to (29), wherein the transmission line is a wire transmission line.

(31) The transmission and reception apparatus according to (26), wherein the connection node is further connected with an output of an analog signal circuit.

(32) The transmission and reception apparatus according to (26), further including an analog reception part configured to receive an analog signal.

(33) The transmission and reception apparatus according to any one of (25) to (32), wherein the reception part at least includes a first receiving section receiving a first reception signal and a second receiving section receiving a second reception signal different from the first reception signal.

(34) A transmission and reception system, including: a transmission apparatus including a D/A converter operative to output a digitally modulated signal and outputting an output of the D/A converter as it is as a transmission signal; and a reception apparatus receiving the transmission signal when the transmission signal is transmitted from the transmission apparatus, the reception part including a receiving section which in turn includes a harmonic wave removing mixer circuit having a frequency down conversion function of a transmission signal inputted thereto from the outside, and a filter circuit configured to select a reception signal from within an output of the harmonic wave removing mixer circuit.

The present disclosure contains subject matter related to that disclosed in Japanese Priority Patent Application JP 2011-263242 filed in the Japan Patent Office on Dec. 1, 2011, the entire content of which is hereby incorporated by reference.

What is claimed is:

1. A transmission and reception apparatus, comprising:
    a transmitting part devoid of a low pass filter and comprising an analog-to-digital converter, a logic circuit, and a digital-to-analog converter configured to produce an output signal including a first digitally modulated signal; and
    a receiving part comprising a mixer circuit, the receiving part being configured to receive an input signal including a second digitally modulated signal, the mixer circuit being configured to perform frequency down conversion on the input signal to produce a frequency-down-converted input signal, wherein
    the transmitting part and the receiving part are contained within the transmission and reception apparatus, and
    the input signal and the output signal are input and output via a common node of the transmission and reception apparatus.

2. The apparatus according to claim 1, wherein the receiving part further comprises a filter circuit, the filter circuit being configured to receive the frequency-down-converted input signal from the mixer circuit and select a predetermined reception signal from the frequency-down-converted input signal.

3. The apparatus according to claim 1, wherein the mixer circuit is configured to perform a harmonic wave removal function on the input signal, the harmonic wave removal function reducing the presence of a folding signal from the input signal, the folding signal being present as a function of the first digitally modulated signal and a clock signal used to produce the first digitally modulated signal.

4. The apparatus according to claim 3, wherein the harmonic wave removal function reduces, from the input signal, signals proximate to three times a frequency of the second digitally modulated signal to reduce the presence of the folding signal.

5. The apparatus according to claim 3, wherein the input signal is produced as output by a counterpart transmission and reception apparatus that provides the input signal, and the harmonic wave removal function reduces the presence of the folding signal from the input signal despite the absence of a low pass filter of the counterpart transmission and reception apparatus.

6. The apparatus according to claim 1, wherein the mixer circuit comprises a plurality of mixers respectively receiving clock signals having a same frequency and different phases.

7. The apparatus according to claim 1, wherein the mixer circuit is one of a plurality of mixer circuits, a first mixer circuit providing a first component of the input signal and a second mixer circuit providing a second component of the input signal.

8. The apparatus according to claim 7, wherein the first component comprises an in-phase (I) signal and the second component comprises a quadrature-phase (Q) signal.

9. The apparatus according to claim 7, wherein the first component comprises a first transmission signal having a first carrier frequency and the second component comprises a second transmission signal having a second carrier frequency.

10. The apparatus according to claim 2, wherein the mixer circuit is one of a plurality of mixer circuits, and the filter circuit is one of a plurality of filter circuits, a first mixer circuit/filter circuit pair providing a first component of the input signal and a second mixer circuit/filter circuit pair providing a second component of the input signal.

11. The apparatus according to claim 3, wherein the input signal further comprises an analog content signal, and the harmonic wave removal function reduces the presence of the folding signal without disturbing the analog content signal.

12. A system for transmitting and receiving signals, the system comprising:
    a first transmission and reception apparatus comprising:
        a first transmitting part devoid of a low pass filter and comprising a first analog-to-digital converter, a first logic circuit, and a first digital-to-analog converter configured to produce a first output signal including a first digitally modulated signal, and
        a first receiving part; and
    a second transmission and reception apparatus comprising:
        a second transmitting part devoid of a low pass filter and comprising a second analog-to-digital converter, a second logic circuit, and a second digital-to-analog converter configured to produce a second output signal including a second digitally modulated signal, and
        a second receiving part comprising a mixer circuit, the second receiving part being configured to receive as an input signal the first output signal including the first digitally modulated signal, the mixer circuit being configured to perform frequency down conversion on the input signal to produce a frequency-down-converted input signal, wherein
    the first transmitting part and the first receiving part are contained within the first transmission and reception apparatus,
    the second transmitting part and the second receiving part are contained within the second transmission and reception apparatus,
    the first input signal and the first output signal are input and output via a first common node of the first transmission and reception apparatus, and
    the second input signal and the second output signal are input and output via a second common node of the second transmission and reception apparatus.

13. The system according to claim 12, wherein the mixer circuit is configured to perform a harmonic wave removal function on the input signal, the harmonic wave removal function reducing the presence of a folding signal from the input signal, the folding signal being present as a function of the second digitally modulated signal and a clock signal used to produce the second digitally modulated signal.

14. The system according to claim 13, wherein the harmonic wave removal function reduces, from the input signal, signals proximate to three times a frequency of the first digitally modulated signal to reduce the presence of the folding signal.

15. The system according to claim 13, wherein the first transmission 1 and reception apparatus outputs the first output signal, and the harmonic wave removal function reduces the presence of the folding signal from the input signal despite the absence of the low pass filter.

16. The system according to claim 12, wherein the mixer circuit is one of a plurality of mixer circuits, a first mixer circuit providing a first component of the input signal and a second mixer circuit providing a second component of the input signal.

17. The system according to claim 16, wherein the first component comprises an in-phase (I) signal and the second component comprises a quadrature-phase (Q) signal.

18. The system according to claim 13, wherein the first output signal further comprises an analog content signal, and the harmonic wave removal function reduces the presence of the folding signal without disturbing the analog content signal.

19. A method for transmitting and receiving signals, the method comprising:
  producing, by an analog-to-digital converter, a logic circuit, and a digital-to-analog converter, an output signal including a first digitally modulated signal; and
  without passing the output signal through a low pass filter, receiving, by a mixer circuit, an input signal including a second digitally modulated signal, the mixer circuit being configured to perform frequency down conversion on the input signal to produce a frequency-down-converted input signal, wherein
  the producing and receiving are performed within the transmission and reception apparatus, and
  the input signal and the output signal are input and output via a common node of the transmission and reception apparatus.

20. A transmission and reception apparatus, comprising:
  a transmitting part devoid of a low pass filter and configured to produce an output signal including a first digitally modulated signal; and
  a receiving part comprising a mixer circuit, the receiving part being configured to receive an input signal including a second digitally modulated signal, the mixer circuit being configured to perform frequency down conversion on the input signal to produce a frequency-down-converted input signal,
  wherein the transmitting part and the receiving part are contained within the transmission and reception apparatus, and
  wherein the input signal and the output signal are input and output via a common node of the transmission and reception apparatus.

* * * * *